INVENTOR
Ronald J. Hawkins
BY
ATTORNEY

May 28, 1968  R. J. HAWKINS  3,385,760
INTEGRAL NUCLEAR REACTOR-HEAT EXCHANGER SYSTEM
Filed July 5, 1966  2 Sheets-Sheet 2
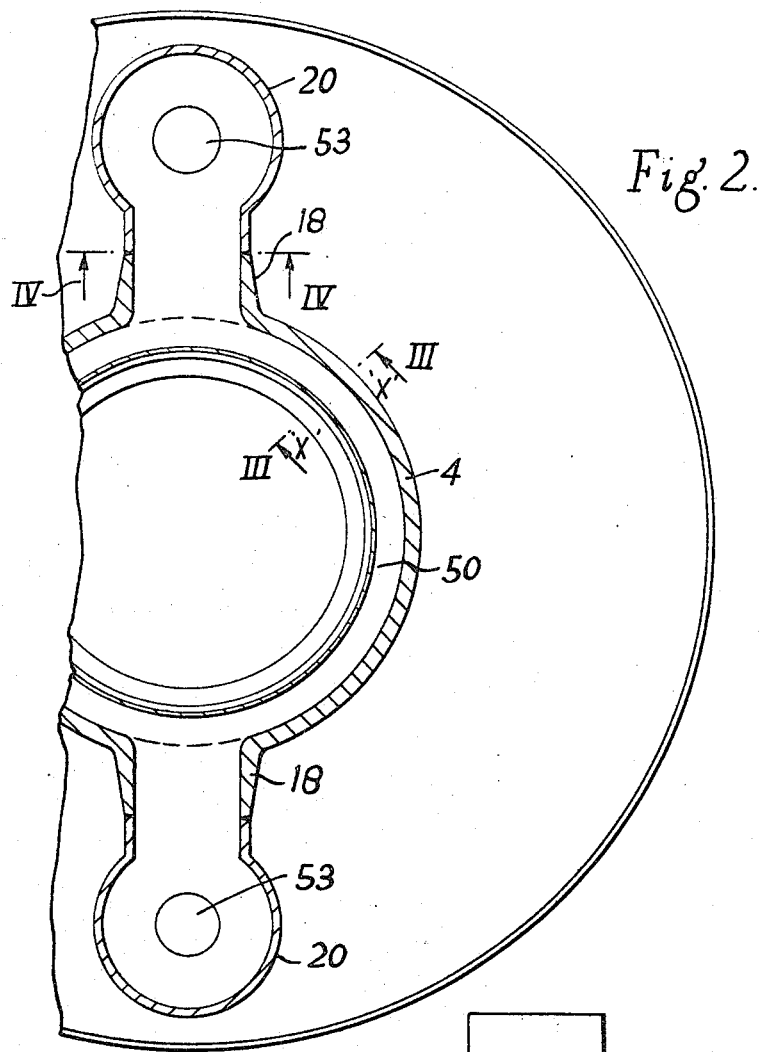
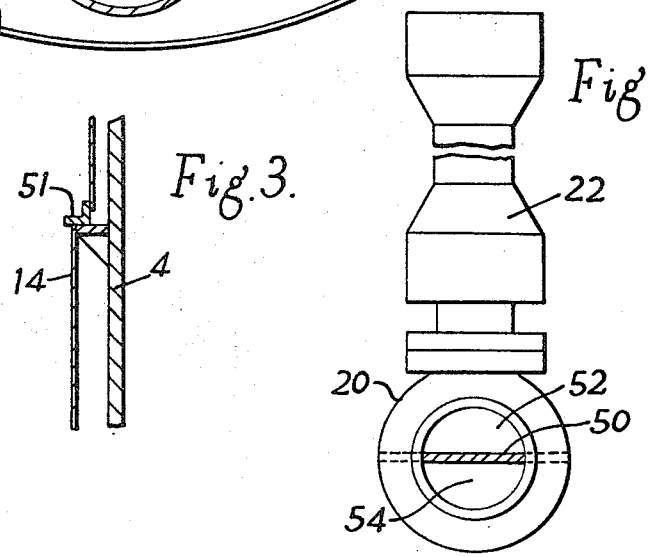

United States Patent Office 3,385,760
Patented May 28, 1968

3,385,760
INTEGRAL NUCLEAR REACTOR-HEAT
EXCHANGER SYSTEM
Ronald J. Hawkins, London, England, assignor to Babcock & Wilcox, Limited, London, England, a corporation of Great Britain
Filed July 5, 1966, Ser. No. 562,627
Claims priority, application Great Britain, July 6, 1965, 28,705/65
5 Claims. (Cl. 176—65)

ABSTRACT OF THE DISCLOSURE

A reactor comprising a pressure vessel in which a reactor core including a fuel assembly is located below the heat exchanger tube banks. The assembly and tube banks are surrounded by a casing spaced apart from the pressure vessel to define an annular flow space. A plurality of chambers extending outwardly from the pressure vessel at a common level have pumps associated therewith for circulating primary coolant through the vessel. Each chamber is divided into a suction and discharge zone by a member sealed to the casing and chamber such that the pump associated with a given chamber circulates coolant through the chamber, annular flow space, core and exchanger.

---

This invention relates to a liquid cooled, liquid moderated integral nuclear reactor. In such a reactor, the pressure vessel houses a reactor core and banks of heat exchange tubes. Primary coolant is circulated in a closed path through the core and the heat exchanger banks through which secondary coolant flows in heat transfer relationship.

The present invention includes an integral nuclear reactor including a cylindrical pressure vessel in which are disposed a nuclear fuel element assembly and, spaced above the assembly, heat exchanger tube banks, the assembly and the tube banks are encircled by a casing defining with the pressure vessel an annular space around the casing, a plurality of chambers extend outwardly at a common level around an intermediate part of the pressure vessel, each chamber is provided with pump means and each chamber is partitioned into a suction and a discharge zone by a dividing member projecting from a peripheral flange sealingly engaged around its outer periphery to the pressure vessel and around its inner periphery to the casing and from which the parts of the casing lying below the flange is suspended.

An embodiment of the invention will now be described by way of example, with reference to the accompanying drawings in which:

FIGURE 2 is a section taken on the line II—II of FIGURE 1 and looking in the direction of the arrows;

FIGURE 3 is a section taken on the line IIII—III of FIGURE 2 and looking in the direction of the arrows; and FIGURE 4 is a section taken on the line IV—IV of FIGURE 2 and looking in the direction of the arrows.

Figure 1:
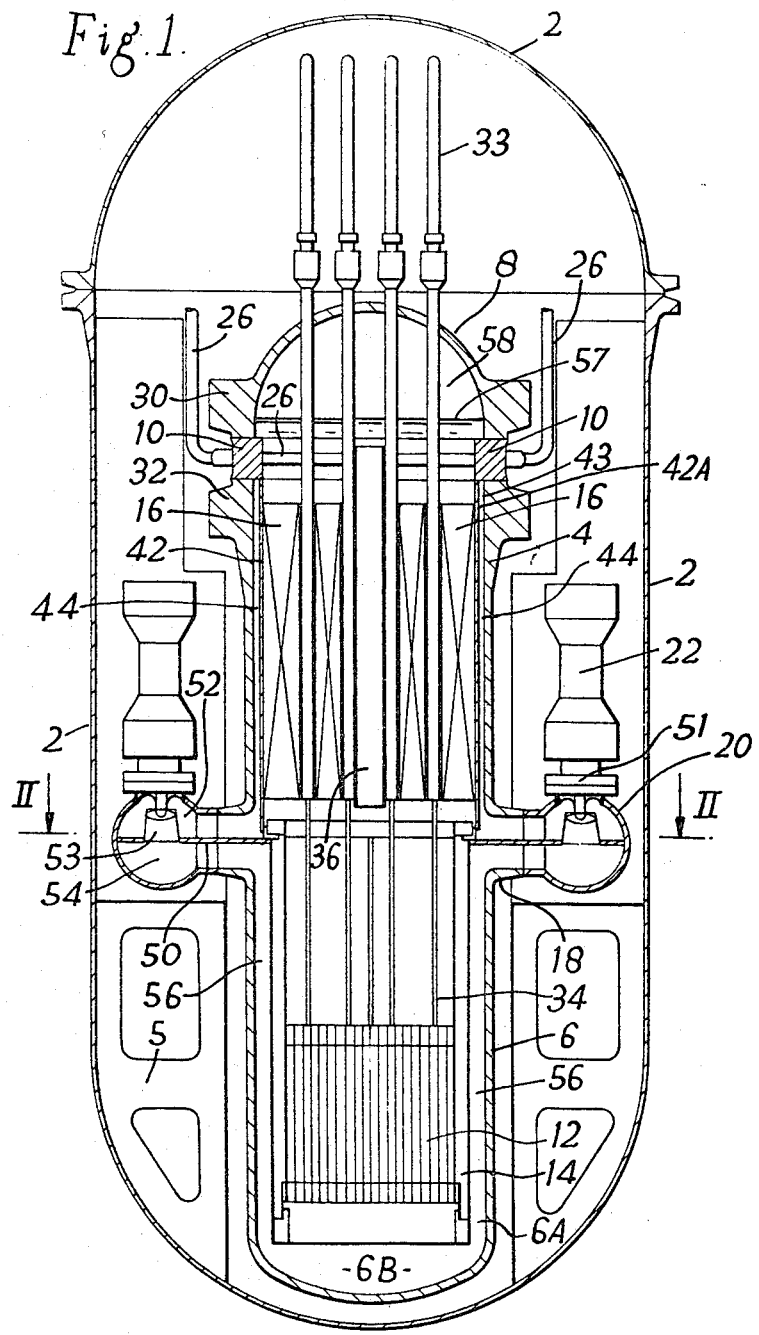
FIGURE 1 is an axial section of an integral nuclear reactor embodying the invention.

The reactor shown in the drawings include a containment vessel 2 housing a cylindrical pressure vessel 4 disposed on a common axis and provided with external apertured bracket members 5 for supporting the pressure vessel 4 within the containment vessel. The pressure vessel 4 has a main body portion 6 and an end portion 8, and includes between the ends of the main body portion 6 and the end portion 8 a ring 10 co-axially interposed between the ends.

A nuclear reactor core 12 is encircled by a casing 14 formed by neutron shielding material and is disposed co-axially with respect to the longitudinal axis of the pressure vessel 2 and is spaced from the wall of the vessel to form an annular space 56 forming part of a flow path for the primary coolant. The casing 14 is disposed in a lower end part 6A of the main body portion 6 and is spaced from the bottom of the pressure vessel wall by turning space 6B for the primary coolant.

Spaced above the core 12 are banks 16 of heat exchange tubes which are of known form. The banks 16 of the heat exchange tubes are enclosed within a cylindrical casing 42 which is coaxially disposed and spaced with respect to the pressure vessel 4. An annular space 44 is formed between the casing 42 and the inner wall of the pressure vessel to provide a further part of the primary coolant flow path. One end 42A of the casing 42 is welded to the ring 10, and the opposite end is in sealing engagement, through L-shaped collar 51, with the casing 14 circling the fuel element assembly. Apertures 43 formed in the casing 42 enable the primary coolant to flow to the annular space 44 from within the casing 42.

Lateral ducts 18 are formed in the side-wall of the body of the pressure vessel 4 extending to respective housings 20 for motor driven rotary pumps 22 used for effecting circulation of primary coolant. Each lateral duct 18 is partitioned by a peripheral flange 50 to define a suction zone 52 and a discharge zone 54, each pump 22 being supplied with fluid from the suction zone 52 are discharging into the discharge zone 54 through an aperture 53 in the flange. The flange 50 not only divides each duct 18 but includes an annular portion from which the parts dividing the ducts 18 extend outwardly. The annular portion is secured around its periphery to the pressure vessel whilst its inner periphery engages and supports the casing 14 through the intermediate of the L-shaped collar 51.

By use of the rotary pumps 22 primary coolant is circulated in a closed flow path and flows from the discharge zone 54 through the annular space 56 and the turning space 6B to the core 14 from which it abstracts heat and gives it up on its further passage through the banks 16 of the heat exchanger tubes and thence flows through the apertures 43 into the annular space 44 and on to the suction zone 52 of the duct 18 for further recirculation.

The end portion 8 is provided with a flange 30 and the main body portion 6 is provided with a corresponding flange 32. The flanges extend outwardly and are respectively located on the upper end of the main body portion 6 and the lower end of the end portion 8.

A control rod operating assembly 33 for the insertion and withdrawal of control rods 34 into and out of the core 12 is provided and passes through openings formed in the end portion 8.

A pressuriser duct 36 extends upwardly from above the core through the banks 16 of the heat exchanger tubes and discharges into a head of coolant, the free coolant level 57 forming the lower limit of a vapour space 58 acting as a pressuriser space for the coolant.

The ring 10 is formed with forty-four uniformly spaced openings 24. Each opening forms passages for conduits 26 and 26A conveying feed water and steam respectively to connect up with the banks 16 of heat exchanger tubes.

The conduits 26 and 26A extend radially, and each feed-water conduit has an adjacent steam discharge conduit. In this particular embodiment, the 44 openings enable the twenty-two feed-water conduits and the twenty-two steam discharge conduits to be spaced uniformly and radially around the circumference of the ring 10. Moreover the feed-water conduits and the steam discharge conduits are arranged alternately and each conduit has a header (not shown) from which the banks 16 of the heat exchanger tubes extend.

The end portion 8, the ring 10 and the body portion 6 are secured together by means of bolts (not shown) which extend through the flange 30 and into this flange 32. Each bolt passes between adjacent conduits 26 and 26A.

The entire internal surface of the pressure vessel 4, including the co-operating faces of the ring 10, the ends of the body portion 6 and the end portion 8, is lined with stainless steel cladding.

In operation, the pressure vessel 4 is filled with water to the level 57 in the vapour space 58 in the end portion 8. The control rods 34 are wholly or partly withdrawn from the core 12 to permit the generation of heat by nuclear reaction within the fuel element assembly. The water is circulated by the two circulating pumps upwardly over the core and banks 16 of the heat exchanger tubes and through the apertures 43 and then downwardly in the annular space 44 to the suction zone 52 of the pump chamber 20. From the sump chamber the primary coolant flows out through the discharge zone 54 through the annular space 56 to the base of the pressure vessel 4 and the turning space 6B, there changing direction to flow upwardly again through the core 12.

In order to gain access to the core within the pressure vessel, the bolts connecting the flanges are removed; the end portion 8, the ring 10 and heat exchangers 16 are removed to permit immediate access to the fuel element assembly within the lower portion of the pressure vessel.

What is claimed is:

1. An integral nuclear reactor comprising an upright cylindrical pressure vessel, a reactor core including a nuclear fuel element assembly disposed within said vessel, a heat exchanger disposed within said vessel above said core, a casing surrounding said core and said heat exchanger and defining with the inner wall of said pressure vessel an annular flow space, means defining a plurality of chambers extending outwardly from an intermediate part of said pressure vessel at a common level, primary fluid circulating pump means associated with each of said chambers for circulating primary fluid through said core, said heat exchanger, and said annular flow space, and a dividing member arranged to divide each of said chambers into a suction zone and a discharge zone relative to said pump means, said dividing member having an annular portion sealingly engaged at its outer periphery with the inner wall of the pressure vessel and sealingly engaged at its inner periphery with said casing.

2. An integral nuclear reactor according to claim 1 wherein said casing is formed with an upper and a lower portion arranged end-to-end, and said portions each have their adjacent ends sealed with the annular portion of said dividing member.

3. An integral nuclear reactor according to claim 2 wherein the lower portion of said casing is suspended from said dividing member.

4. An integral nuclear reactor according to claim 2 wherein the upper portion of said casing encircles the heat exchanger, the lower portion of said casing encircles the core, and said dividing member divides said annular flow space into upper and lower flow spaces respectively surrounding said heat exchanger and said core.

5. An integral nuclear reactor according to claim 3 wherein said core is suspendedly supported by said dividing member.

References Cited
UNITED STATES PATENTS

| | | | |
|---|---|---|---|
| 3,151,034 | 9/1964 | Douglas et al. | 176—53 |
| 3,163,585 | 12/1964 | Metcalfe et al. | 176—65 |
| 3,226,300 | 12/1965 | Zmola et al. | 176—53 |
| 3,245,879 | 4/1966 | Purdy et al. | 176—53 |

L. DEWAYNE RUTLEDGE, *Primary Examiner.*